(12) United States Patent
Schnellbacher et al.

(10) Patent No.: US 9,036,557 B2
(45) Date of Patent: May 19, 2015

(54) WIRELESS COMMUNICATION DEVICE WITH BOTH A WIRELESS TRANSCEIVER AND A WIRELESS PAGING RECEIVER

(71) Applicant: Sprint Communications Company L.P., Overland Park, KS (US)

(72) Inventors: George Jason Schnellbacher, Overland Park, KS (US); Louis Eric Wingo, Liberty, MO (US); Zhisheng Chen, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/188,990

(22) Filed: Feb. 25, 2014

(65) Prior Publication Data

US 2014/0169314 A1    Jun. 19, 2014

Related U.S. Application Data

(63) Continuation of application No. 13/078,205, filed on Apr. 1, 2011, now Pat. No. 8,699,414.

(51) Int. Cl.
| | | |
|---|---|---|
| *H04W 4/00* | (2009.01) | |
| *H04W 68/02* | (2009.01) | |
| *H04W 36/14* | (2009.01) | |
| *H04W 48/18* | (2009.01) | |
| *H04W 68/00* | (2009.01) | |
| *H04W 88/06* | (2009.01) | |

(52) U.S. Cl.
CPC .............. *H04W 68/02* (2013.01); *H04W 36/14* (2013.01); *H04W 48/18* (2013.01); *H04W 68/00* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 4,978,944 A | 12/1990 | Andros et al. | |
| 5,794,159 A | 8/1998 | Portin | |
| 5,889,814 A | 3/1999 | Simmons | |
| 5,926,466 A | 7/1999 | Ishida et al. | |
| 5,956,326 A | 9/1999 | Magana | |
| 6,130,897 A | 10/2000 | Ishida et al. | |
| 6,434,122 B2 | 8/2002 | Barabash et al. | |
| 7,376,093 B2 | 5/2008 | Barabash et al. | |
| 8,442,475 B2 * | 5/2013 | Antonio et al. ............ | 455/343.1 |
| 2002/0071480 A1 | 6/2002 | Marjelund et al. | |
| 2003/0100308 A1 | 5/2003 | Rusch | |

(Continued)

FOREIGN PATENT DOCUMENTS

| | | |
|---|---|---|
| EP | 1531561 | 5/2005 |
| WO | 2007089556 | 8/2007 |

*Primary Examiner* — Bob Phunkulh

(57) ABSTRACT

A wireless communication device communicates using a Long Term Evolution (LTE) wireless protocol and a different wireless protocol. The wireless device processes a first user input to direct a wireless transceiver to transmit and receive using the different wireless protocol and to direct a wireless paging receiver receive using the LTE wireless protocol. The transceiver then transmits and receives using the different wireless protocol, and the paging receiver receives pages using the LTE wireless protocol. The device processes a second user input to direct the transceiver to transmit and receive using the LTE wireless protocol, and the transceiver uses the LTE wireless protocol. In some examples, the device also processes the second user input to direct the paging receiver to receive other pages using the different wireless protocol, and the paging receiver receives the other pages using the different wireless protocol.

20 Claims, 8 Drawing Sheets

(56) References Cited

U.S. PATENT DOCUMENTS

| | | |
|---|---|---|
| 2005/0148348 A1 | 7/2005 | Cramby et al. |
| 2006/0223575 A1 | 10/2006 | Su |
| 2007/0207806 A1* | 9/2007 | Shaheen .................. 455/436 |
| 2008/0069063 A1 | 3/2008 | Li et al. |
| 2008/0119145 A1 | 5/2008 | Lee et al. |
| 2009/0131054 A1 | 5/2009 | Zhang |
| 2010/0067434 A1* | 3/2010 | Siu et al. .................. 370/328 |
| 2010/0074171 A1* | 3/2010 | Noguchi et al. ............ 370/328 |
| 2010/0173667 A1 | 7/2010 | Hui et al. |
| 2010/0331019 A1 | 12/2010 | Bhattacharjee et al. |
| 2011/0183670 A1* | 7/2011 | Wu .......................... 455/435.1 |
| 2011/0280141 A1 | 11/2011 | Chin et al. |
| 2011/0280221 A1 | 11/2011 | Chin et al. |
| 2012/0122511 A1* | 5/2012 | Antonio et al. ............ 455/522 |
| 2012/0263045 A1 | 10/2012 | Fauconnier et al. |
| 2012/0269173 A1* | 10/2012 | Chin et al. ................ 370/332 |

* cited by examiner

WIRELESS COMMUNICATION DEVICE WITH BOTH A WIRELESS TRANSCEIVER AND A WIRELESS PAGING RECEIVER

RELATED CASES

This patent application is a continuation of U.S. patent application Ser. No. 13/078,205 that was filed on May 1, 2011 and is entitled "WIRELESS COMMUNICATION DEVICE WITH BOTH A WIRELESS TRANSCEIVER AND A WIRELESS PAGING RECEIVER." U.S. patent application Ser. No. 13/078,205 is hereby incorporated by reference into this patent application.

TECHNICAL BACKGROUND

Wireless communication devices use various wireless protocols to communicate with wireless networks. In some cases, a single wireless communication device may use multiple different wireless protocols, such as Frequency Division Duplex (FDD) and Time Division Duplex (TDD). For example, a wireless communication device may use an FDD protocol for voice communications and use a TDD protocol for data communications.

Many of these wireless protocols have associated paging channels. The paging channels provide information to a user, such as network notifications, call alerts, message alerts, text messages, or some other user notifications or requests. Some wireless devices that use multiple protocols may only have a single transceiver to physically receive and transfer wireless signals. In these scenarios, the single transceiver may interrupt wireless communications over one protocol in order to look at the paging channel of another protocol. Thus, the one transceiver must monitor all of the paging channels.

Alternatively, the transceiver may not interrupt the wireless communications and simply miss the pages on the other protocol. Other wireless devices may be configured with multiple transceivers—one for each protocol. The use of multiple transceivers to monitor the paging channels of multiple different protocols quickly consumes battery life.

Overview

A wireless communication device communicates using a Long Term Evolution (LTE) wireless protocol and a different wireless protocol. The wireless device processes a first user input to direct a wireless transceiver to transmit and receive using the different wireless protocol and to direct a wireless paging receiver receive using the LTE wireless protocol. The transceiver then transmits and receives using the different wireless protocol, and the paging receiver receives pages using the LTE wireless protocol. The device processes a second user input to direct the transceiver to transmit and receive using the LTE wireless protocol, and the transceiver uses the LTE wireless protocol. In some examples, the device also processes the second user input to direct the paging receiver to receive other pages using the different wireless protocol, and the paging receiver receives the other pages using the different wireless protocol. The wireless paging receiver is not configured for wireless transmission.

DETAILED DESCRIPTION

Figure 1:
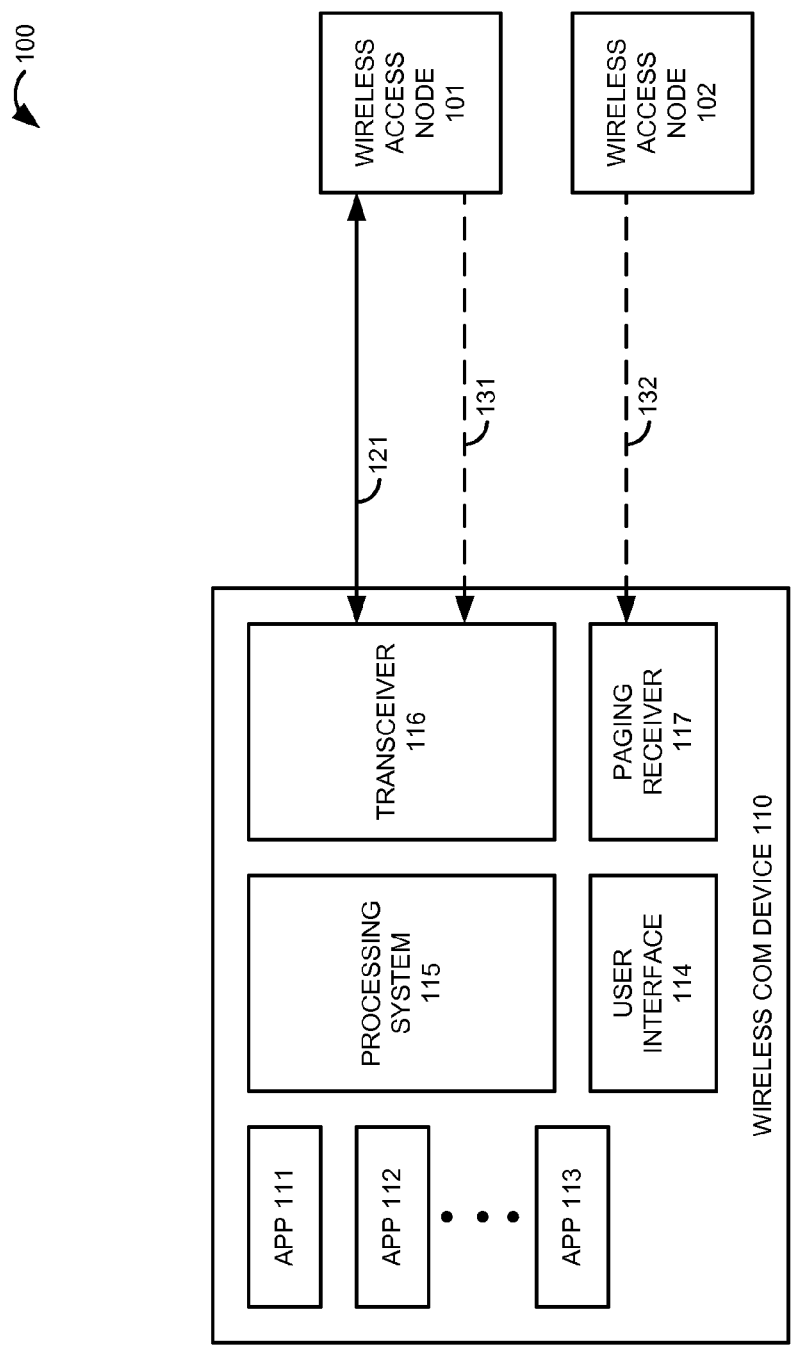
FIG. 1 illustrates a communication system with a wireless communication device that has a wireless transceiver and a separate paging receiver.

FIG. 1 illustrates communication system 100. Communication system 100 comprises wireless access nodes 101-102 and wireless communication device 110. Wireless communication device 110 comprises applications 111-113, user interface 114, processing system 115, transceiver 116, and paging receiver 117. User interface 114 receives a first user instruction to execute application 111, and application 111 requires wireless communications 121.

Processing system 115 selects a first wireless protocol for wireless communications 121 based on application 111 and in response to the first user instruction. For application 111, transceiver 116 exchanges wireless communications 121 with wireless access node 101 using the first wireless protocol. Transceiver 116 also monitors paging channel 131 of the first wireless protocol.

While transceiver 116 and wireless access node 101 communicate over the first wireless protocol, paging receiver 117 monitors paging channel 132 from wireless access node 102. Paging channel 132 is for a second wireless protocol that is different from the first protocol. In some examples, paging receiver 117 also monitors additional paging channels of other non-selected wireless protocols in response to the application-based selection of the first wireless protocol. In some examples, paging receiver 117 is not capable of wireless transmission, and as a result, paging receiver 117 consumes less power than transceiver 116.

Paging receiver 117 eventually receives a page over paging channel 132. The page indicates application 112. User interface 114 presents a user notification in response to the page. User interface 114 then receives a second user instruction to execute application 112.

Figure 2:
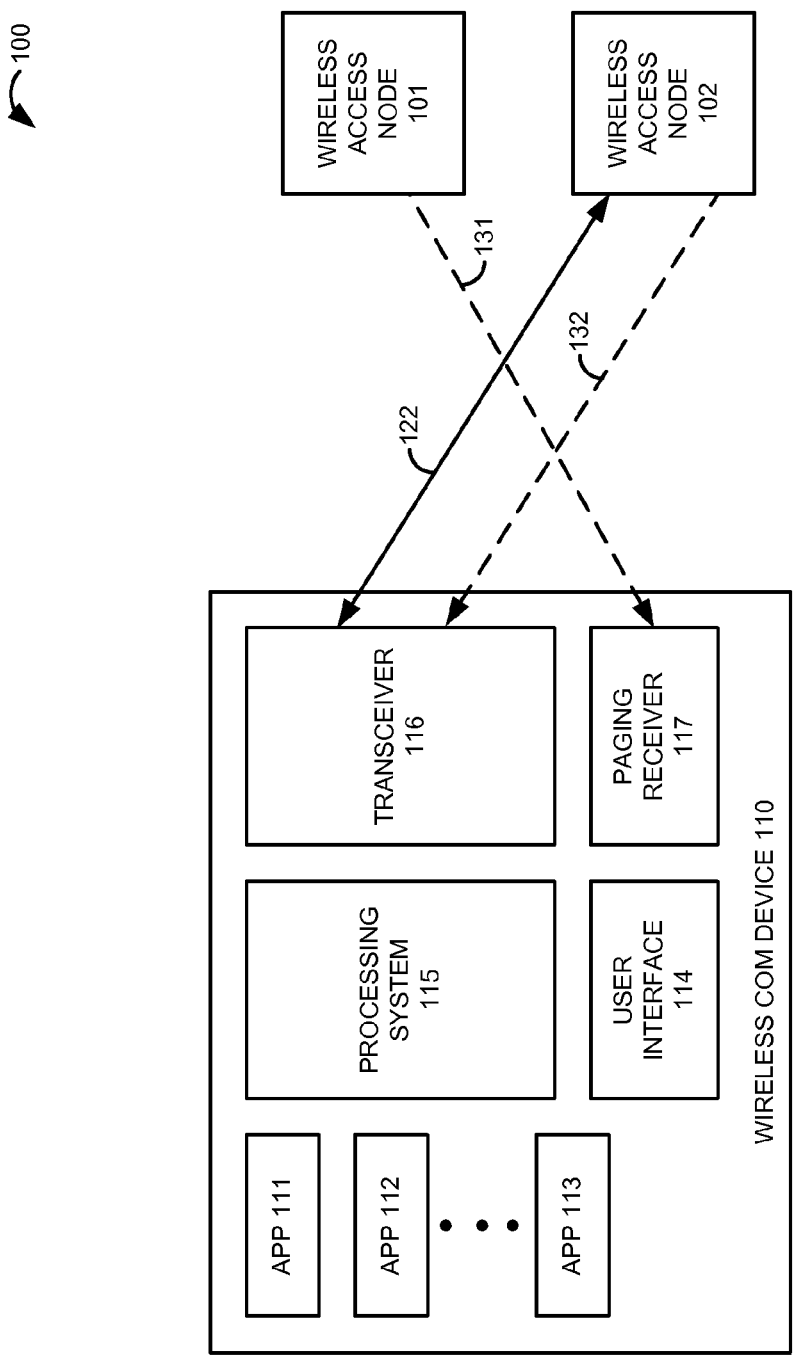
FIG. 2 illustrates a communication system with a wireless communication device that has a wireless transceiver and a separate paging receiver.

Referring to FIG. 2, application 112 requires wireless communications 122. Processing system 115 selects the second wireless protocol for wireless communications 122 based on application 112 and in response to the second user instruction. For application 112, transceiver 116 exchanges wireless communications 122 with wireless access node 102 using the second wireless protocol. Transceiver 116 also monitors paging channel 132 of the second wireless protocol. While transceiver 116 and wireless access node 102 communicate over the second wireless protocol, paging receiver 117 now monitors paging channel 131 from wireless access node 101 for the first wireless protocol.

In some examples, a Frequency Division Duplex (FDD) protocol is selected for synchronous communications (like peer-to-peer media streaming), and a Time Division Duplex (TDD) protocol is selected for asynchronous communications (like web surfing and downloads). If the user selects application 111 which uses synchronous communications, then an FDD protocol is used by transceiver 116, and paging receiver 117 uses a TDD protocol. If the user selects application 112 which uses asynchronous communications, then a TDD protocol is used by transceiver 116, and paging receiver 117 uses an FDD protocol.

Thus, wireless communication device 110 can use multiple wireless protocols and selects the wireless protocol for transceiver 116 based on the application selected (or allowed) by the user. Transceiver 116 also monitors the paging channel for the selected wireless protocol. Paging receiver 117 monitors the paging channel for the non-selected wireless protocol(s). Paging receiver 117 could be a relatively low-power system as compared to transceiver 116.

Figure 3:
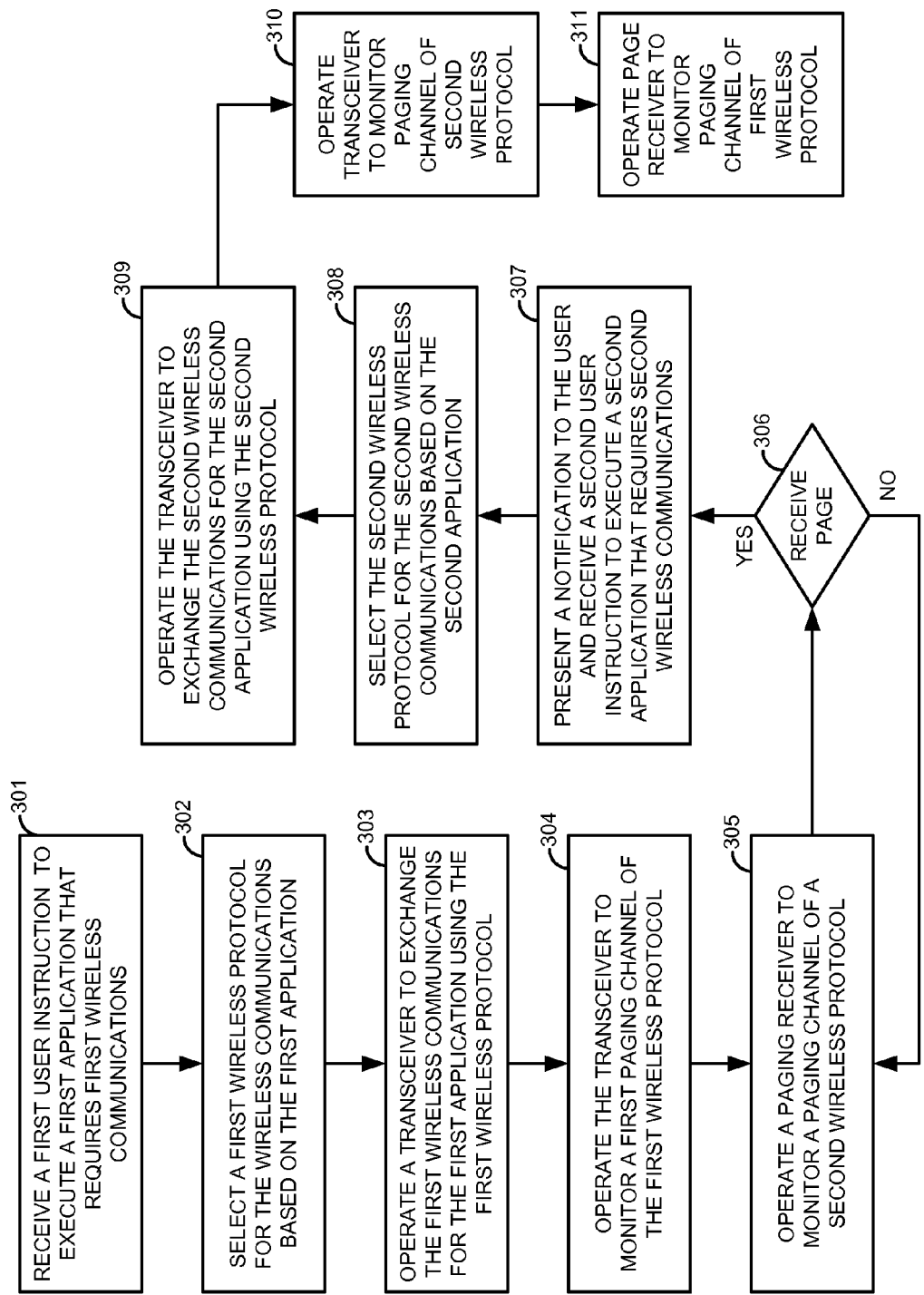
FIG. 3 illustrates the operation of a wireless communication device that has a wireless transceiver and a separate paging receiver.

FIG. 3 illustrates the operation of a wireless communication device, such as a telephone, computer, network access card, internet appliance, and the like. The wireless communication device receives a first user instruction to execute a first application requiring first wireless communications (301). In response to the first user instruction, the wireless communication device selects a first wireless protocol for the first wireless communications based on the first application (302). The wireless communication device operates a transceiver to exchange the first wireless communications for the first application using the first wireless protocol (303). The wireless communication device also operates the transceiver to monitor a first paging channel of the first wireless protocol (304).

In response to the application-based selection of the first wireless protocol, the wireless communication device operates a paging receiver to monitor a second paging channel of a second wireless protocol (305). If the paging receiver receives a page over the second paging channel (306), then the wireless communication device presents a notification to the user and receives a second user instruction to execute a second application that requires second wireless communications (307).

In response to the second user instruction, the wireless communication device selects a second wireless protocol for the second wireless communications based on the second application (308). The wireless communication device operates the transceiver to exchange the second wireless communications for the second application using the second wireless protocol (309). The wireless communication device also operates the transceiver to monitor the second paging channel of the second wireless protocol (310).

In response to the application-based selection of the second wireless protocol, the wireless communication device operates the paging receiver to monitor the first paging channel of the first wireless protocol (311). If the paging receiver receives a page over the first paging channel, then the initial process may repeat (301).

Figure 4:
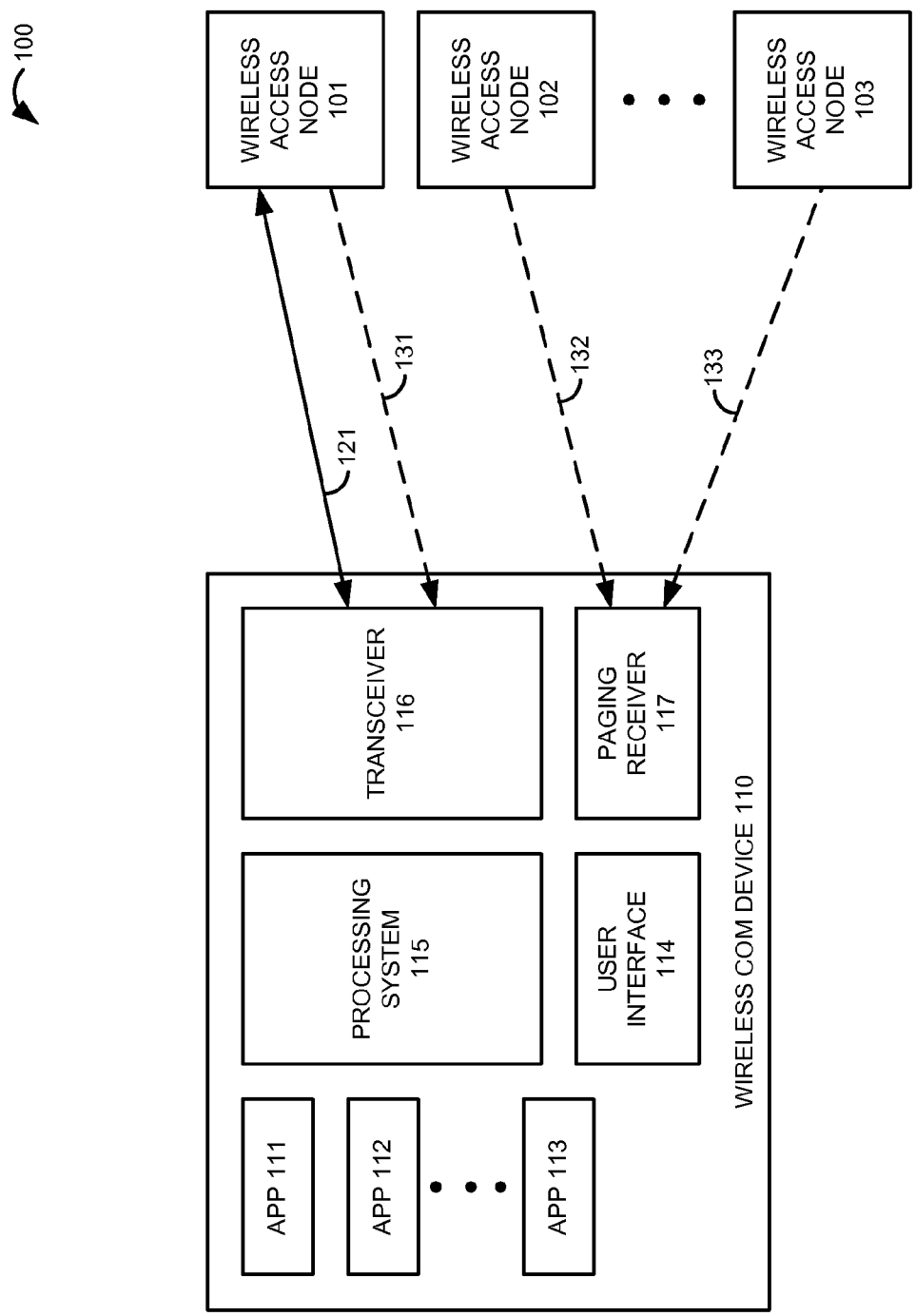
FIG. 4 illustrates a communication system with a wireless communication device that has a wireless transceiver and a separate paging receiver for monitoring multiple paging channels.

FIG. 4 illustrates communication system 100 that has been modified from FIGS. 1-2 to include wireless access node 103 that uses a third wireless protocol. User interface 114 receives a first user instruction to execute application 111, and application 111 requires wireless communications 121.

Processing system 115 selects a first wireless protocol for wireless communications 121 based on application 111 and in response to the first user instruction. For application 111, transceiver 116 exchanges wireless communications 121 with wireless access node 101 using the first wireless protocol. Transceiver 116 also monitors paging channel 131 of the first wireless protocol.

While transceiver 116 and wireless access node 101 communicate over the first wireless protocol, paging receiver 117 monitors paging channels 132-133 from respective wireless access node 102-103. In this example, paging receiver 117 also monitors paging channel 133 for a third wireless protocol in response to the application-based selection of the first wireless protocol. The first, second, and third wireless protocols are different from one another.

Paging receiver 117 receives a page over paging channel 133. The page indicates application 113. User interface 114 presents a user notification in response to the page. User interface 114 then receives a third user instruction to execute application 113.

Figure 5:
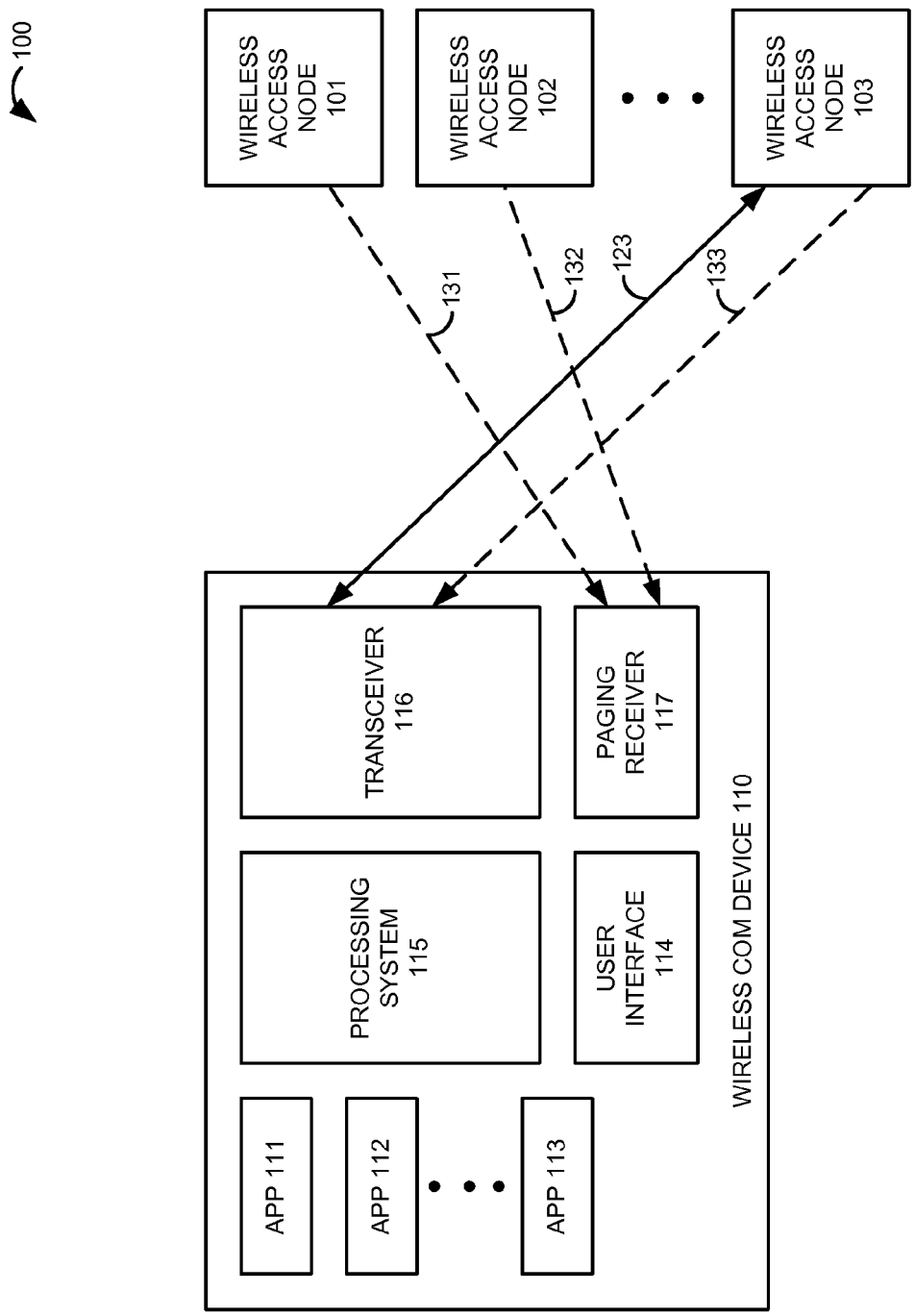
FIG. 5 illustrates a communication system with a wireless communication device that has a wireless transceiver and a separate paging receiver for monitoring multiple paging channels.

Referring to FIG. 5, application 113 requires wireless communications 123. Processing system 115 selects the third wireless protocol for wireless communications 123 based on application 113 and in response to the third user instruction. For application 113, transceiver 116 exchanges wireless communications 123 with wireless access node 103 using the third wireless protocol. Transceiver 116 also monitors paging channel 133 of the third wireless protocol. While transceiver 116 and wireless access node 103 communicate over the third wireless protocol, paging receiver 117 now monitors paging channels 131-132 from respective wireless access nodes 101-102 for the first and second wireless protocols.

Thus, wireless communication device 110 can use multiple wireless protocols and select the wireless protocol for transceiver 116 based on the application selected (or allowed) by the user. Transceiver 116 also monitors the paging channel for the selected wireless protocol. Paging receiver 117 monitors the paging channel for the non-selected wireless protocols. Paging receiver 117 could be a relatively low-power system as compared to transceiver 116.

Figure 6:
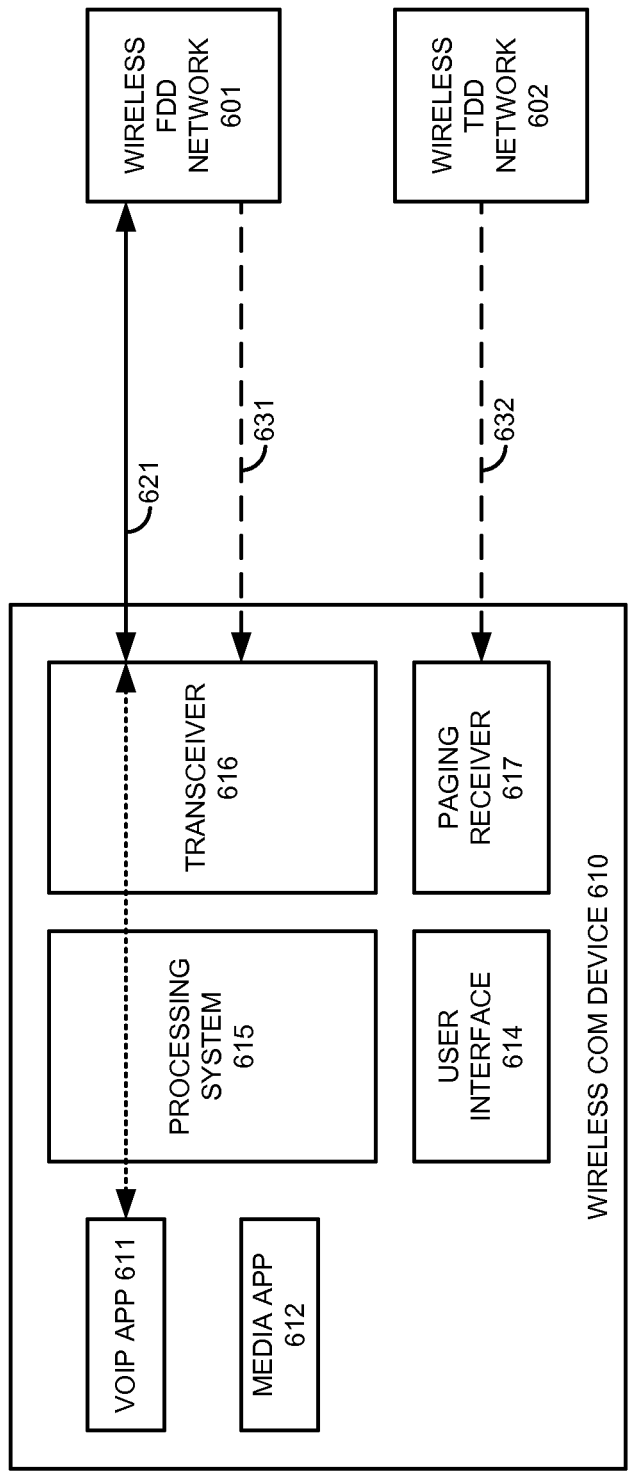
FIG. 6 illustrates a communication system with a wireless communication device that has a wireless transceiver and a separate paging receiver for interoperating with FDD and TDD networks.
Figure 7:
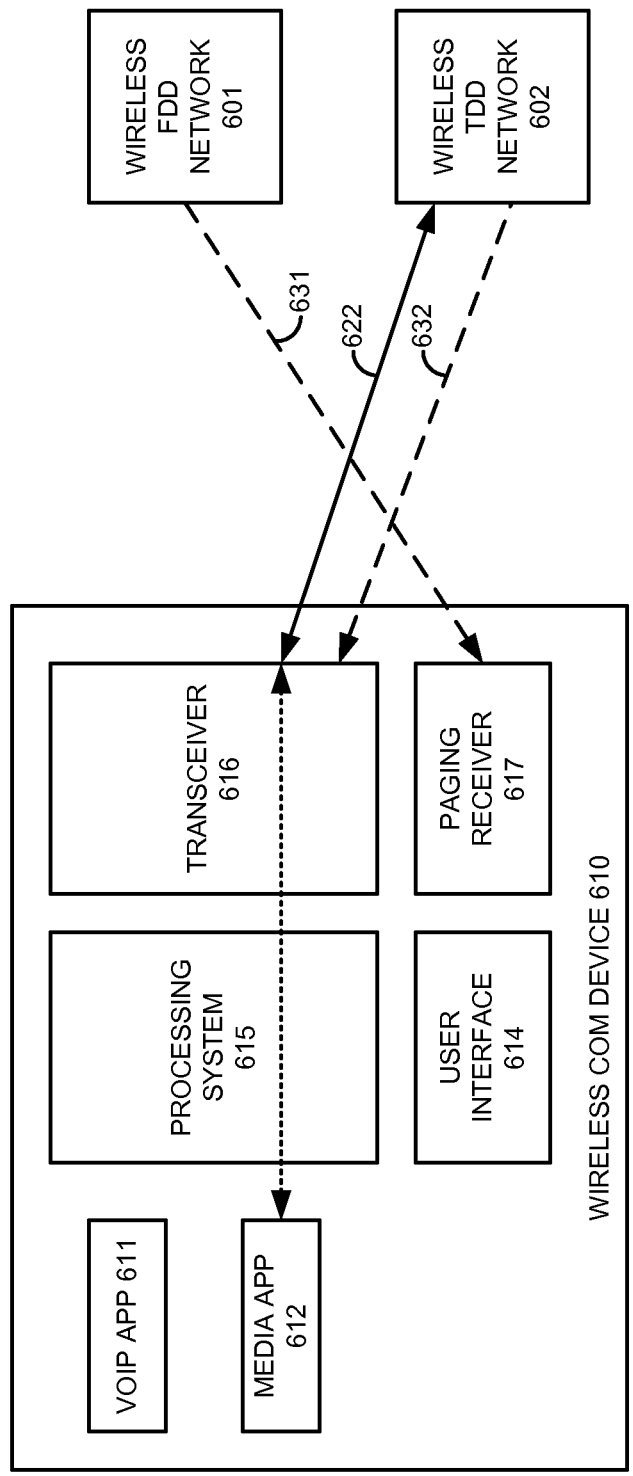
FIG. 7 illustrates a communication system with a wireless communication device that has a wireless transceiver and a separate paging receiver for interoperating with FDD and TDD networks.

FIG. 6 illustrates communication system 600. Communication system 600 comprises wireless FDD network 601, wireless TDD network 602, and wireless communication device 610. Wireless communication device 610 comprises Voice Over Internet Protocol (VOIP) application 611, media access application 612, user interface 614, processing system 615, transceiver 616, and paging receiver 617. User interface 614 receives a first user instruction to execute VOIP application 611.

Processing system 615 selects an FDD protocol based on VOIP application 611 and in response to the first user instruction. For VOIP application 611, transceiver 616 exchanges wireless communications 621 with FDD network 601 using the selected wireless FDD protocol. Transceiver 616 also monitors FDD paging channel 631 from FDD network 601.

While transceiver 116 and wireless FDD network 601 communicate over the FDD protocol, paging receiver 617 monitors TDD paging channel 632 from TDD network 602. Paging receiver 617 eventually receives a TDD page over TDD paging channel 632. The TDD page indicates media access application 612. User interface 614 presents a user notification in response to the TDD page. User interface 114 then receives a second user instruction to execute media access application 612.

Processing system 115 selects the TTD protocol based on media access application 612 and in response to the second user instruction. For media access application 612, transceiver 616 now exchanges wireless communications 622 with TDD network 602 using the selected TDD protocol. Transceiver 616 also monitors TDD paging channel 632. While transceiver 616 and TDD network 602 communicate over the TDD protocol, paging receiver 617 now monitors FDD paging channel 631 from FDD network 601.

Note that in a reciprocal manner, the user may have initially selected media access application 612. In this scenario, transceiver 616 would initially communicate with TDD network 602 for media access application 612, and paging receiver would monitor FDD paging channel 631. If an FDD page were received and accepted by the user for VOIP application 611, then transceiver 616 would communicate with FDD network 601 for VOIP application 611, and paging receiver would then monitor TDD paging channel 632.

Figure 8:
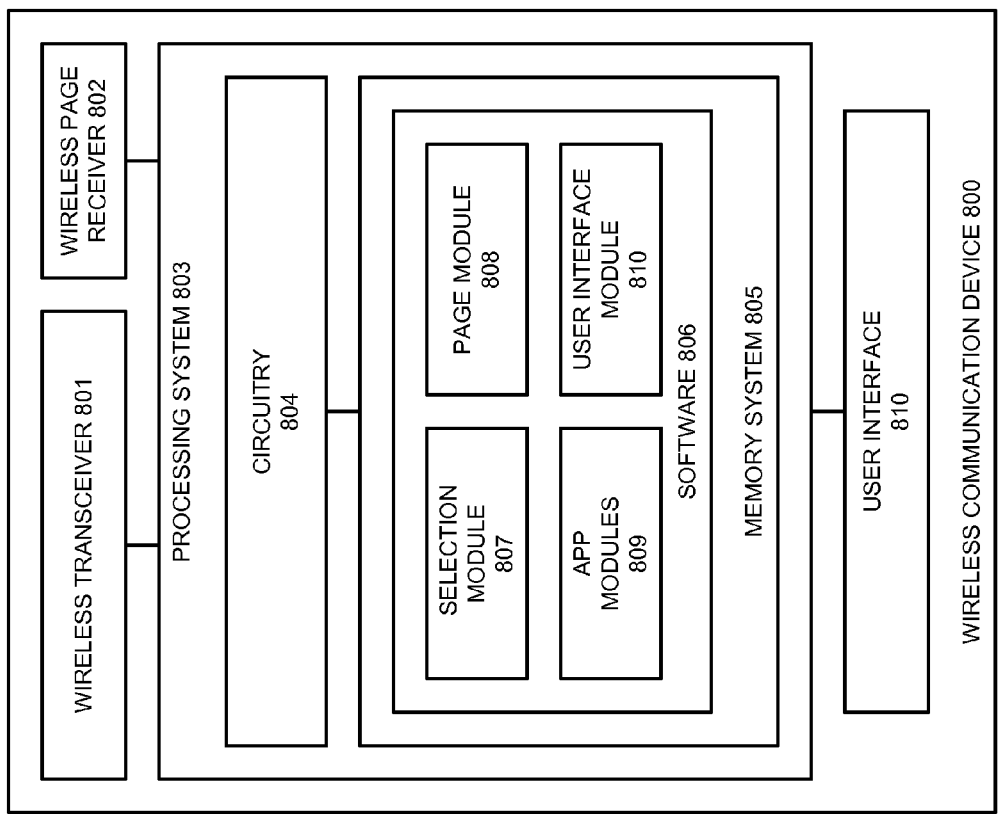
FIG. 8 illustrates a wireless communication device that has a wireless transceiver and a separate paging receiver.

FIG. 8 illustrates wireless communication device 800. Wireless communication device 800 provides an example of the wireless communication devices described above, although these wireless devices could use alternative configurations. Wireless communication device 800 may comprise a telephone, computer, e-book, mobile Internet appliance, media player, game console, wireless network interface card, or some other wireless communication apparatus—including combinations thereof.

Wireless communication device 800 comprises wireless communication transceiver 801, wireless paging receiver 802, processing system 803, and user interface 810. Processing system 803 is linked to wireless transceiver 801, wireless page receiver 802, and user interface 803. Processing system 803 includes processing circuitry 804 and memory system 805 that stores operating software 806. Operating software 806 comprises software modules 807-810. Wireless communication device 800 may include other well-known components such as a battery and enclosure that are not shown for clarity.

Wireless communication transceiver 801 comprises RF communication circuitry and an antenna. The RF communication circuitry typically includes an amplifier, filter, RF modulator/demodulator, and signal processing circuitry. Wireless communication transceiver 801 may also include a memory device, software, processing circuitry, or some other communication components. Wireless communication transceiver 801 may use various protocols, such as Code Division Multiple Access (CDMA), Global System for Mobile communications (GSM), Universal Mobile Telecommunications System (UMTS), High-Speed Packet Access (HSPA), Evolution-Data Optimized (EV-DO), Long Term Evolution (LTE), Worldwide Interoperability for Microwave Access (WiMAX), IEEE 802.11 protocols (Wi-Fi), Bluetooth, or some other wireless protocol that facilitates wireless communications. Note that wireless transceiver 801 may use at least two different wireless protocols that have respective paging channels as directed by processing system 803.

Wireless paging receiver 802 is not configured for wireless transmission, and as a result, wireless receiver 802 uses far less power than wireless transceiver 801. Wireless paging receiver 802 also comprises RF communication circuitry and an antenna. The RF communication circuitry typically includes an amplifier, filter, RF demodulator, and signal processing circuitry. Wireless paging receiver 802 may also include a memory device, software, processing circuitry, or some other communication components. Wireless paging receiver 802 may use various protocols, such as CDMA, GSM, UMTS, HSPA, EV-DO, LTE, WiMAX, Wi-Fi, Bluetooth, or some other wireless protocol that facilitates wireless communications. Note that wireless paging receiver 802 may use at least two different protocols to monitor respective paging channels as directed by processing system 803.

User interface 803 comprises components that interact with a user to receive user instructions and to present media and/or information. User interface 803 may include a speaker, microphone, buttons, lights, display screen, touch screen, touch pad, scroll wheel, communication port, or some other user input/output apparatus—including combinations thereof. User interface 803 may be omitted in some examples.

Processing circuitry 804 comprises microprocessor and other circuitry that retrieves and executes operating software 806 from memory system 805. Memory system 805 comprise a disk drive, flash drive, data storage circuitry, or some other memory apparatus. Processing circuitry 804 is typically mounted on a circuit board that may also hold memory device 805 and portions of transceiver 801, receiver 802, and user interface 803. Operating software 806 comprises computer programs, firmware, or some other form of machine-readable processing instructions. Operating software 806 may include an operating system, utilities, drivers, network interfaces, applications, or some other type of software. In this example, operating software 806 comprises software modules 807-810, although software 806 could have alternative configurations in some examples.

When executed by processing circuitry 804, operating software 806 directs processing system 803 to operate wireless communication device 800 as described above for wireless communication devices. In particular, selection module 807 directs processing system 803 to select wireless protocols for transceiver 801 based on user-selected (or allowed) applications that require wireless communications. Page module 808 directs processing system 803 to select wireless protocols for receiver 802 based on the non-selected applications that do not currently require wireless communications. Application modules 809 include VOIP modules, media download modules, web browsing modules, and the like. User interface module 810 directs processing system 803 to notify the user of incoming pages and to receive user application selections.

Referring back to FIG. 1, wireless access nodes 101-102 comprises RF communication circuitry and an antenna. The RF communication circuitry typically includes an amplifier, filter, RF modulator, and signal processing circuitry. Wireless access nodes 101-102 may also comprise a router, server, memory device, software, processing circuitry, cabling, power supply, network communication interface, structural support, or some other communication apparatus. Wireless access nodes 101-102 could comprise a base station, Internet access node, telephony service node, wireless data access point, or some other wireless communication system—including combinations thereof. Some examples of wireless access nodes 101-102 include a base transceiver station (BTS), base station controller (BSC), radio base station (RBS), Node B, enhanced Node B (eNode B), and others. Wireless network protocols that may be utilized by wireless access node 110 include CDMA, GSM, UMTS, HSPA, EV-DO, LTE, WiMAX, Wi-Fi, Bluetooth, or some other communication format—including combinations thereof.

User interface 114 includes components that interact with a user to receive user instructions and to present media and/or information. User interface 114 may include a speaker, microphone, buttons, lights, display screen, touch screen, touch pad, scroll wheel, communication port, or some other user input/output apparatus—including combinations thereof. User interface 114 may be omitted in some examples.

Processing system 115 comprises microprocessor and other circuitry that retrieves and executes operating software from a memory system. The memory system comprises a disk drive, flash drive, data storage circuitry, or some other memory apparatus. The software, which includes applications 111-113, comprises computer programs, firmware, or some other form of machine-readable processing instructions.

Transceiver 116 and paging receiver 117 each comprise Radio Frequency (RF) communication circuitry and an antenna. The RF communication circuitry typically includes an amplifier, filter, demodulator (modulator for transceiver 116), and signal processing circuitry.

Wireless communication device 110 may also include a user interface, memory device, software, processing circuitry, or some other communication components. For example, wireless communication device 110 could comprise a phone, transceiver, computer, e-book, game console, Internet appliance, network interface card, media player, or some other wireless communication apparatus—including combinations thereof. Wireless network protocols that may be utilized by wireless communication device 101 include CDMA, GSM, UMTS, HSPA, EV-DO, LTE, WiMAX, Wi-Fi, Bluetooth, or some other wireless network protocol that facilitates wireless communications.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication device to wirelessly communicate using a Long Term Evolution (LTE) wireless protocol and a different wireless protocol, the wireless communication device comprising:
    a user interface configured to receive a first user input and a second user input;
    a wireless transceiver configured to transmit and receive using one of the LTE wireless protocol and the different wireless protocol;
    a wireless paging receiver configured to wirelessly receive pages using the LTE wireless protocol, wherein the wireless paging receiver is not configured for wireless transmission; and
    a processing system configured to process the first user input to direct the wireless transceiver to transmit and receive using the different wireless protocol and to direct the wireless paging receiver receive pages using the LTE wireless protocol, and to process the second user input to direct the wireless transceiver to transmit and receive using the LTE wireless protocol.

2. The wireless communication device of claim 1 wherein:
    the processing system is configured to process the second user input to direct the wireless paging receiver receive other pages using the different wireless protocol; and
    the wireless paging receiver is configured to wirelessly receive the other pages using the different wireless protocol.

3. The wireless communication device of claim 1 wherein:
    the wireless transceiver comprises an antenna, a modulator, and a demodulator; and
    the wireless paging receiver comprises another antenna and another demodulator.

4. The wireless communication device of claim 1 wherein the wireless paging receiver is configured to consume less power than the wireless transceiver.

5. The wireless communication device of claim 1 wherein the wireless paging receiver is configured to wirelessly receive voice call pages using the LTE wireless protocol.

6. The wireless communication device of claim 1 wherein the wireless paging receiver is configured to wirelessly receive voice call pages using the different wireless protocol.

7. The wireless communication device of claim 1 wherein the different wireless protocol comprises a Code Division Multiple Access (CDMA) protocol.

8. The wireless communication device of claim 1 wherein the different wireless protocol comprises a Global System for Mobile communications (GSM) protocol.

9. The wireless communication device of claim 1 wherein the different wireless protocol comprises an Evolution Data Optimized (EVDO) protocol.

10. The wireless communication device of claim 1 wherein the different wireless protocol comprises a High Speed Packet Access (HSPA) protocol.

11. A method of operating a wireless communication device to wirelessly communicate using a Long Term Evolution (LTE) wireless protocol and a different wireless protocol, the method comprising:
    in a user interface, receiving a first user input;
    in a processing system, processing the first user input to direct a wireless transceiver to transmit and receive using the different wireless protocol and to direct a wireless paging receiver receive pages using the LTE wireless protocol;
    in the wireless transceiver, transmitting and receiving using the different wireless protocol;
    in the wireless paging receiver, wirelessly receiving pages using the LTE wireless protocol, wherein the wireless paging receiver is not configured for wireless transmission;
    in the user interface, receiving a second user input;
    in the processing system, processing the second user input to direct the wireless transceiver to transmit and receive using the LTE wireless protocol; and
    in the wireless transceiver, transmitting and receiving using the LTE wireless protocol.

12. The method of claim 11 further comprising:
    in the processing system, processing the second user input to direct the paging receiver receive other pages using the different wireless protocol; and
    in the wireless paging receiver, wirelessly receiving the other pages using the different wireless protocol.

13. The method of claim 11 wherein:
    the wireless transceiver comprises an antenna, a modulator, and a demodulator; and
    the wireless paging receiver comprises another antenna and another demodulator.

14. The method of claim 11 wherein the wireless paging receiver consumes less power than the wireless transceiver.

15. The method of claim 11 wherein wirelessly receiving pages using the LTE wireless protocol in the wireless paging receiver comprises wirelessly receiving voice call pages.

16. The method of claim 11 further comprising, in the wireless paging receiver, wirelessly receiving voice call pages using the different wireless protocol.

17. The method of claim 11 wherein the different wireless protocol comprises a Code Division Multiple Access (CDMA) protocol.

18. The method of claim 11 wherein the different wireless protocol comprises a Global System for Mobile communications (GSM) protocol.

19. The method of claim 11 wherein the different wireless protocol comprises an Evolution Data Optimized (EVDO) protocol.

20. The method of claim 11 wherein the different wireless protocol comprises a High Speed Packet Access (HSPA) protocol.

* * * * *